331-98
SEARCH ROOM

Tr1144
X1150
X1365
X1352

Jan. 29, 1957 A. TYKULSKY 2,779,873

ULTRA-SWEEP OSCILLATOR

Filed Sept. 28, 1954 2 Sheets-Sheet 1

INVENTOR.
ALEXANDER TYKULSKY
BY
A. D. T. Libby
ATTORNEY

Jan. 29, 1957 A. TYKULSKY 2,779,873

ULTRA-SWEEP OSCILLATOR

Filed Sept. 28, 1954 2 Sheets-Sheet 2

INVENTOR.
ALEXANDER TYKULSKY
BY A. D. T. Libby
ATTORNEY

United States Patent Office 2,779,873

Patented Jan. 29, 1957

2,779,873

ULTRA-SWEEP OSCILLATOR

Alexander Tykulsky, Budd Lake, N. J., assignor to Ohmega Laboratories, Pine Brook, N. J.

Application September 28, 1954, Serial No. 458,840

16 Claims. (Cl. 250—36)

This invention relates to an ultra-sweep oscillator unit construction operating in the range from 300 to 1000 megacycles and which employs a co-axial tuning half-wave transmission line that is tapered to extend the frequency range. Forming a part of the unit construction is a loud speaker type of variable capacitor provided with frequency modulation. Some of the new and useful functions of this invention are as follows:

1. It has only a single set of sliding contacts.

2. Cathode impedance is maintained relatively high over the band covered by the oscillator, so that it does not need to be tuned.

3. The grid of the tube used in the structure is well grounded so that it is possible to draw an appreciable grid current without over heating.

4. The mechanical construction hereinafter described permits stable and accurate tuning.

5. The circuit connections used in the structure automatically compensates for transit effects permitting oscillations up to and in excess of 900 megacycles.

6. The U. H. F. output can be taken direct from the cathode circuit so that no pick up probe is needed.

7. A relatively high output power is available over the band width of the structure.

8. A wide frequency swing is obtained, up to approximately 10% of the oscillator frequency, with a relatively small amplitude modulation.

9. Fairly constant output and a wide tuning ratio is obtained over the band width of the structure.

Other objects or functions of the invention will no doubt appear to one skilled in this art from the description which follows:

In the drawing, Figure 1 is a part sectional and part elevational view through my new structure, in one position of operation.

Figures 1, 3:
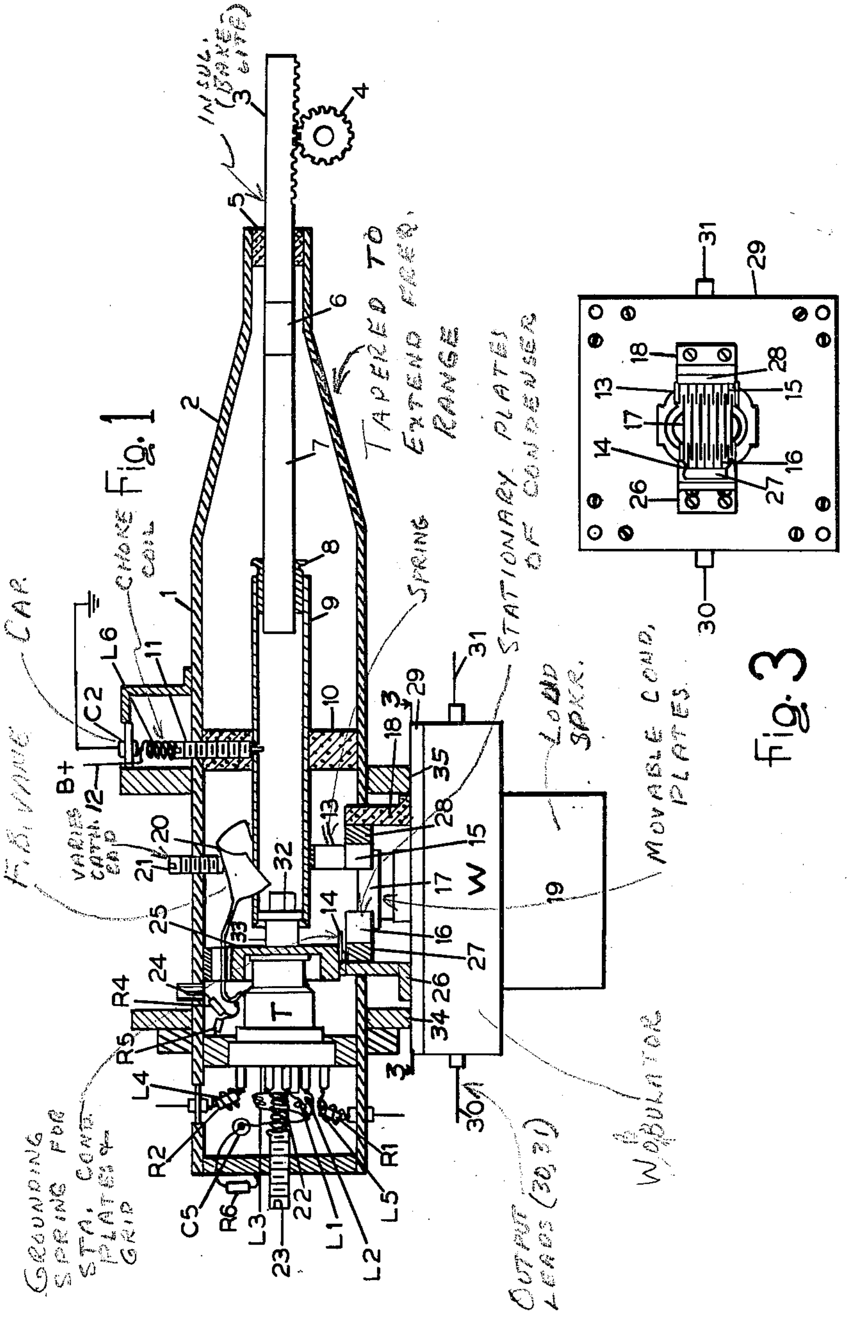
Figure 3 is a plan view of the structure part defined by the line 3—3 of Figure 1.
Figure 2:
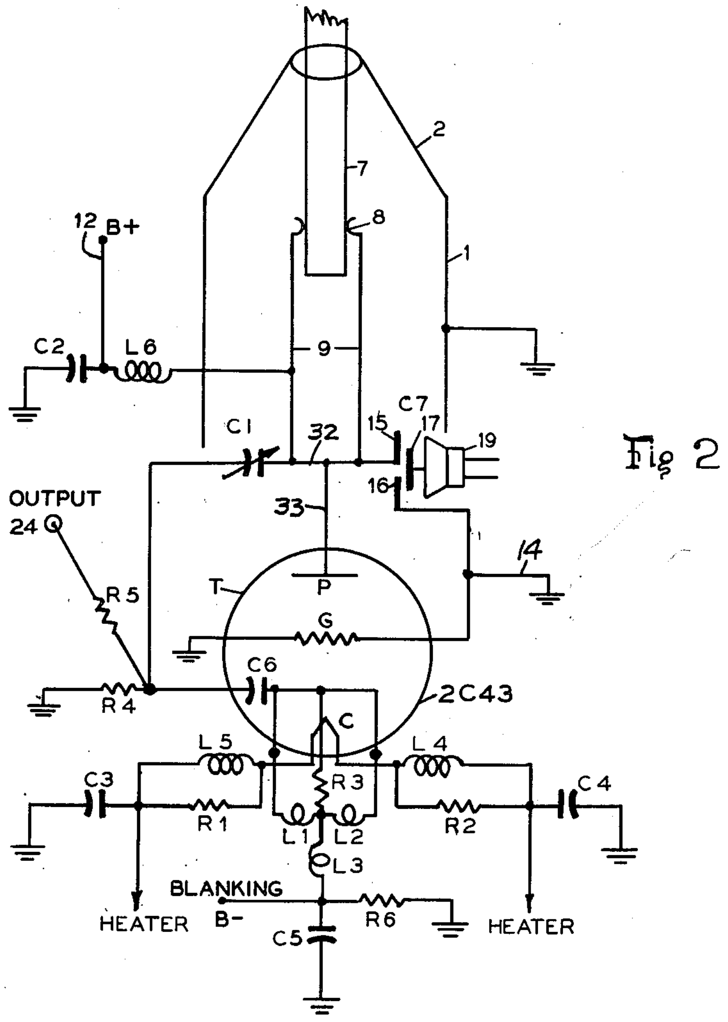
Figure 2 is a schematic view of the electrical circuit of the structure shown in Figure 1.

Referring to Figures 1 and 2, 1 is a tubular housing having a tapered end 2 which forms a foreshortened ½ co-axial transmission line, that can be tuned by means of an adjustable rack 3 preferably of suitable material such as Bakelite having teeth in mesh with a tuning gear wheel 4. The rack 3 is mainly carried in a bearing 5 of suitable plastic material while the inner end of the rack 3 is connected to insulator 6 of suitable material and this insulator is connected to a member 7, the inner end of which is positioned in a set of flexible contacts forming a bushing 8 carried by a fixed portion 9 of the inner conductor of the line. The construction just described may be varied in length to suit the requirements. An insulator 10, of a suitable material, holds the inner conductor 9 in position and also carries a screw 11 preferably of brass, the outer end of which is attached to a suitable choke coil L6 that is connected to condenser C2 and by line 12 to a suitable power supply B+ while the condenser C2 is connected to ground. The inner end of the tube 9 is preferably slitted to make a good spring contact with the metallic disc 32 which is connected to the plate P of the tube T.

Attached to the tube 1 by suitable supports 34 and 35, is a structure W known as wobulator having output leads 30 and 31. Associated with the wobulator W is a loud speaker mechanism 19. Mounted on the plate 29 of wobulator W as shown in Figure 3 is an insulator 18 which carries a metallic member 28 that supports stationary plates 15 to which is attached a spring 13 that makes contact with the tube 9. Also carried by the plate 29 is a metallic member 26 on which a member 27 is mounted and which is slitted to carry fixed condenser plates or blades 16. The member 26 also carries a spring 14 which serves to ground the plates 16 that are connected to the grid G of tube T. For cooperation with the condenser plates 15 and 16 through the medium of the movable plates 17 to form an adjustable variable condenser C7 as shown in Figure 2 across the oscillators resonant circuit and cause frequency modulation when the loud speaker mechanism 19 is energized. Grid G of tube T is also connected to the ring 25 (see Figure 1).

The feed back vane 20 is adjusted by an insulator screw 21 to vary the cathode plate capacity C1, Figure 2. A spring 22 and screw 23 are utilized to apply pressure to the tube T for holding it in operative position, the output connector being shown at 24.

The foreshortened ½ length resonator, together with grid-to-cathode-and-plate and plate-to-cathode capacity, forming a Colpitts oscillator. The cathode impedance is formed by the combined effect of the output termination including resistances R4 and R5 along with the capacity of the vane 20, the cathode and heater structure within the vacuum tube T including capacity C6, heater and cathode choke L1 and L4 and associated impedance cores R1, R2 and R3. This combination produces a phase shift in the feed back voltage which maintains oscillations up to 900 mc. in spite of transit time effects. The coil L6 is connected at a point on the line which is at relatively low potentials for those frequencies at which the choke might cause the greatest leading effects. Condensers C3, C4 and C5 are by-pass condensers.

From what has been said it will be readily appreciated that many of the details may be varied without departing from the spirit of my invention and the scope of the appended claims.

Having thus described my invention, what I claim is:

1. An ultra-sweep oscillator operative within the range from 300 to 1000 megacycles and comprising, a unitary structure having a circular casing with a tapering end, a metallic member extending from the tapered end with means for adjusting the longitudinal length of said member, an extension of said member running through and on the diameter of said circular member, a radio type tube operatively connected to the inner end of said extension and means such as condensers, resistors and inductances connected to said tube for causing it to send electrical waves out of the extension end of the structure.

2. An ultra-sweep oscillator operative within the range from 300 to 1000 megacycles and comprising, a unitary structure having a circular casing with a tapering end, a metallic member extending from the tapered end with means for adjusting the longitudinal length of said member, an extension of said member running through and on the diameter of said circular member, a radio type tube operatively connected to the inner end of said extension and a high voltage supply connected through a suitable choke coil to said inner extension, said radio type tube being connected to suitable elements to cause the tube to send out suitable electrical waves.

3. An ultra-sweep oscillator as set forth in claim 2 further defined in that the high voltage supply is connected to said extension at a point to minimize the effects of choke resonance or losses.

4. An ultra-sweep oscillator structure including a suitable tube of the radio type having its plate connected to a tubular member having a tube slidably and operatively located at its outer end, the tubular member and the slidable tube being housed within a casing having an end tapering away from said first mentioned tubular member, a member connected to the slidable member and projecting beyond the tapered end of the casing and means for adjusting the location of the projecting member and means for energizing the tube to cause impulses therefrom to move onto said projecting member.

5. An ultra-sweep oscillator as set forth in claim 4 further defined in that the tubular member and slidable tubes connected thereto form a foreshortened ½ wave length co-axial transmission line as defined herein.

6. An ultra-sweep oscillator as set forth in claim 4 further defined in that the tubular member and slidable tubes connected thereto form a foreshortened ½ wave length co-axial transmission line and further defined in that said adjusting means for the said projecting member serves to tune the transmission line.

7. An ultra-sweep oscillator as set forth in claim 4 further defined in that the cathode impedance of the radio type tube is formed by cathode and heater wiring therewithin including the resistors, capacitances and inductances connected to the tube.

8. An ultra-sweep oscillator as set forth in claim 4 further defined in that the cathode impedance of the radio type tube is formed by cathode and heater wiring therewithin including the resistors, capacitances and inductances as defined herein, one of said resistors $R_3$, which is the grid return resistor, is also used for blanking the cathode C of the tube T.

9. An ultra-sweep oscillator comprising, a unitary structure having a casing with a high frequency tube located at one end of the casing and supplied with the necessary elements to produce the frequencies desired, said casing having its opposite end extending in a tapering form to produce at least a part of a co-axial transmission line with means carried by said tapering end for adjustably tuning the transmission line.

10. An ultra-sweep oscillator as set forth in claim 4 further defined in that the cathode impedance of the radio type tube is formed by cathode and heater wiring therewithin, including the resistors, capacitances and inductances, and associated components acting in such a fashion as to compensate for transit time effects and permitting oscillation up to 900 megacycles.

11. An ultra-sweep oscillator as set forth in claim 4 further defined in that part a resonant circuit is formed by a variable capacitance which may be driven electromagnetically to produce frequency modulation.

12. An ultra-sweep oscillator as defined in claim 4, further defined in that only a single set of sliding contacts is employed to obtain tuning.

13. An ultra-sweep oscillator structure including an electrical tube having at least one, plate, grid and cathode, a tubular housing terminating in a free end and being operatively associated with said electrical tube, a rack having one end carried in the free end of said housing and means for longitudinally adjusting said rack, a circular member extending from said rack member inwardly of said housing, a tubular member extending inwardly from said circular member and having its inner end operatively connected to said electrical tube and thereby forming the inner conductor of a transmission line.

14. An ultra-sweep oscillator structure as set forth in claim 13 further defined in that the cathode of said electrical tube has a relatively high impedance over the band covered by the oscillator structure.

15. An ultra-sweep oscillator structure as set forth in claim 13 further defined in that the grid of the electrical tube is well grounded whereby it is possible to draw an appreciable grid current without over heating and the ultra high frequency output can be obtained direct from the cathode of the tube.

16. An ultra-sweep oscillator structure as set forth in claim 13 further defined in that the structure described permits stable and accurate tuning over a wide ratio within the band width of the structure.

References Cited in the file of this patent

UNITED STATES PATENTS

| | | |
|---|---|---|
| 1,932,448 | Clavier | Oct. 31, 1933 |
| 2,490,968 | Keizer et al. | Dec. 13, 1949 |
| 2,547,637 | Gardiner et al. | Apr. 3, 1951 |
| 2,641,647 | Wallin | June 9, 1953 |